United States Patent [19]
Higuchi et al.

[11] 3,993,846
[45] Nov. 23, 1976

[54] MAGNETIC RECORDING MEDIUM

[75] Inventors: Shigetaka Higuchi; Yoshiaki Hisagen, both of Sendai; Tetsuya Mayuzumi, Higashi-kurume; Masatoshi Tokita, Annaka, all of Japan

[73] Assignee: Sony Corporation, Tokyo, Japan

[22] Filed: July 17, 1974

[21] Appl. No.: 489,241

[30] Foreign Application Priority Data
July 21, 1973 Japan............................... 48-80824

[52] U.S. Cl................................ 428/447; 428/539; 428/900
[51] Int. Cl.²............................. H01F 10/02
[58] Field of Search......................... 117/234–240, 117/161 ZA; 252/62.54; 427/127–132; 428/900, 539, 447

[56] References Cited
UNITED STATES PATENTS

| 3,476,595 | 11/1969 | Nacci | 117/235 X |
| 3,526,533 | 9/1970 | Jacknow et al. | 117/161 X |
| 3,542,589 | 11/1970 | Hartmann et al. | 117/235 |
| 3,547,693 | 12/1970 | Huguenard | 117/235 |
| 3,554,798 | 1/1971 | Nacci | 117/235 |
| 3,555,557 | 1/1971 | Nacci | 117/235 X |
| 3,625,760 | 12/1971 | Slovinsky | 117/235 |

OTHER PUBLICATIONS

Friedman et al., IBM Tech. Dis. Bull., vol. 9, No. 7, Dec. 1966, p. 779.

*Primary Examiner*—Bernard D. Pianalto
*Attorney, Agent, or Firm*—Hill, Gross, Simpson, Van Santen, Steadman, Chiara & Simpson

[57] ABSTRACT

A magnetic recording medium having a non-magnetic base and a dispersion of magnetic particles coated thereon. The magnetic layer includes a polyoxyalkylene substituted organosilicic compound to reduce friction and to reduce wear on the magnetic head.

5 Claims, No Drawings

MAGNETIC RECORDING MEDIUM

BACKGROUND OF THE INVENTION

1. Field of the Invention

This invention is in the field of magnetic recording media consisting of a base of non-magnetic material and a magnetic layer containing finely divided magnetic particles dispersed in a binder material and including a specific type of organosilicic compound in the magnetic layer to reduce friction.

2. Description of the Prior Art

In any magnetic recording and reproducing system, the magnetic tape consisting of a base film of non-magnetic material and a magnetic layer containing finely divided magnetic particles dispersed in a binder runs in contact with the tape guiding members, and the magnetic heads at substantial velocities. The problem of frictional wear is particularly difficult in the extremely high velocity systems encountered in video tape recorders. Accordingly, the magnetic tape must be considerably wear-proof and have a small coefficient of friction. It is also required that the magnetic tape run smoothly and steadily. Since the life of the magnetic head is decreased with increasing wear, the surface of the magnetic tape must be very smooth. Despite attempts made to develop relatively low friction magnetic tapes, none has been thoroughly successful.

In general practice, a lubricant such as castor oil, molybdenum disulfide, or graphite or the like is mixed into the magnetic coating containing the magnetic powder dispersed in a material binder. It has also been suggested that a higher fatty acid or a derivative of such fatty acid could be added to the magnetic dispersion or paint. However, none of the above-mentioned materials provides a sufficient smoothness to the magnetic tape. Moreover, the conventional magnetic tape has the disadvantage that roughing of its surface or blooming is likely to occur.

SUMMARY OF THE INVENTION

This invention relates to improved magnetic recording medium having satisfactory smoothness, higher wear life and higher wear resistivity. It involves adding to the magnetic layer a lubricant consisting of a polyoxyalkylene substituted organosilicic compound. This compound is the reaction product between dimethyl silane or a terminal reactive polydimethyl siloxane with a polyoxyalkylene glycol monoalcohol ether having an aliphatic alkyl or alkenyl group containing from 8 to 18 carbon atoms.

DESCRIPTION OF THE PREFERRED EMBODIMENTS

We have now found that organosilicic compounds having the following general formula have extraordinary properties as lubricants:

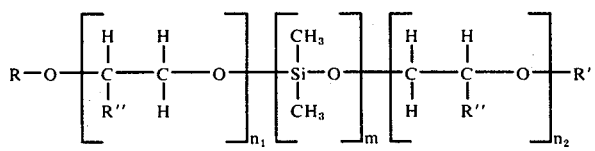

where R and R' represent an aliphatic hydrocarbon group (alkyl or alkenyl) having 8 to 18 carbon atoms, R'' is a hydrogen atom or a methyl group, $m$ is in the range from 1 to 15, and $n_1+n_2$ is in the range of 2 to 16.

From 0.3 to 10 parts by weight of the organosilicic compound, and preferably from 0.3 to 3 parts by weight of the compound are added to 100 parts of the magnetic powder contained in the magnetic layer. When more than 10 parts of the organosilicic compound are added, the mechanical strength of the magnetic layer is substantially reduced and the wear resistivity of the magnetic layer is significantly reduced. When less than 0.3 part of the organosilicic compound is added, the lubricating effect is insufficient.

In the above general formula, R and R' are aliphatic hydrocarbon groups which are either alkyl or alkenyl. The wear of the magnetic head and the dynamic friction coefficient of the magnetic layer are increased when the number of carbon atoms of the terminal hydrocarbon groups is less than 8. When the number of carbon atoms of the terminal hydrocarbon group is more than 18, blooming occurs and the wear resistivity of the magnetic tape is reduced so that substantial amounts of magnetic powder come off the magnetic tape. The blooming decreases with an increase in the value of m. However, the wear of the magnetic head and the dynamic friction coefficient of the magnetic tape are increased when m is greater than 15 so that the magnetic tape may run unsteadily.

The melting point of the organosilicic compound is lowered by the presence of the polyoxyalkylene group, so that blooming and the peeling of the magnetic powder are effectively prevented. On the other hand, a very high $n_1+n_2$ is undesirable, since the wear of the magnetic head increases substantially. Preferably $n_1+n_2$ is in the range of 2 to 16.

The organosilicic compound used in this invention can be easily synthesized from dimethylsilane or terminal reactive siloxanes represented by the following general formula:

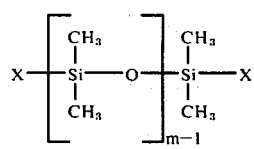

where X is a halogen atom, a hydrogen atom, a hydroxyl group or an alkoxyl group having from 1 to 3 carbon atoms, and $m$ is from 1 to 15 with a polyoxyalkylene glycolmonoalcohol ether represented by the general formula:

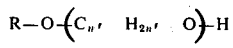

where R is an alkyl or alkenyl group containing 8 to 18 carbon atoms and $n'$ is 2 or 3.

The following specific examples illustrate more particularly the compositions of the present invention, and the effect of variations in the compositions:

EXAMPLE 1

Approximately 64.5 parts of dimethyldichlorosilane were added with stirring into a mixture of 56 parts of $C_{18}H_{37}O(C_3H_6O)_5H$, 79 parts of pyridine and 30 parts of toluene, at room temperature and then heated at 50° to 60° C for 2 hours. After cooling, the hydrochloride salts of the pyridine were removed from the products by filtration, and the solvent was completely removed from the products under reduced pressure. As a result, 51.3 parts of $C_{18}H_{37}O(C_3H_6O)_5$-$Si(CH_3)_2$-$O$-$(C_3H_6O)_5$-$C_{18}H_{37}$ were obtained at a yield of 95%. The product in this case has an $m$ of 1, and $n_1+n_2$ equal the 10 in the general formula.

A magnetic dispersion with the following composition was prepared:

| | |
|---|---|
| Gamma ferric oxide powder | 100 parts |
| Vinylchloride-vinylacetate copolymer resin | 20 parts |
| Polyurethane resin | 10 parts |
| Carbon (antistatic agent) | 0.5 parts |
| Lecithin (dispersing agent) | 1.0 parts |
| Organosilicic compound (lubricant) | 2.0 parts |
| Solvent | 300 parts |

Six samples of organosilicic compounds which had the same $n_1+n_2$ value, but differed in m were prepared. From these samples, six magnetic dispersions were prepared. The components of these dispersions were mixed with each other and the resulting mixtures were coated on polyethylene terephthalate films to a thickness of 10 microns to form six samples of magnetic tape which are hereinafter described as samples 1 to 6.

The amount of peeling off of the magnetic powder, the wear of the magnetic head, and the dynamic friction coefficient were measured on each of the prepared magnetic tapes. The amount of peeling off of the magnetic powder represents the wear-proofness of magnetic tape. The dynamic friction coefficient represents the quality of the tape-running. The results of the measurements are shown in Table 1:

Table 1

| | ($R,R' = C_{18}H_{37}$, $R'' = CH_3$) | | | |
|---|---|---|---|---|
| Sample | m | $n_1+n_2$ | Wear of magnetic head ($\mu$) | Dynamic friction coeff. | coming-off of powder ($\mu g$) |
| No. 1 | 1 | 10 | 1.7 | 0.03 | 50 |
| No. 2 | 2 | 10 | 1.9 | 0.05 | 45 |
| No. 3 | 6 | 10 | 2.1 | 0.08 | 45 |
| No. 4 | 10 | 10 | 2.0 | 0.08 | 60 |
| No. 5 | 15 | 10 | 3.5 | 0.105 | 65 |
| No. 6 | 20 | 10 | 10.2 | 0.25 | 65 |

As apparent from Table 1, the wear of the magnetic head is substantially increased when m is more than 15, whereas the dynamic friction coefficient is larger and the tape running is more unstable.

EXAMPLE 2

In this example, R and R' were $C_{18}H_{37}$ and R'' was $CH_3$. Six samples of the organosilicic compound having a constant $m$ but differing in $n_1+n_2$ values were prepared. The wear of the magnetic head, the dynamic friction coefficient, and the coming-off of the magnetic powder were measured on the magnetic tapes (samples 7–12) coated with six kinds of magnetic dispersions.

The results of the measurements are shown in Table 2.

Table 2

| | ($R,R' = C_{18}H_{37}$, $R'' = CH_3$) | | | | |
|---|---|---|---|---|---|
| Sample | m | $n_1+n_2$ | Wear of magnetic head ($\mu$) | Dynamic friction coeff. | coming off of powder ($\mu g$) |
| No. 7 | 1 | 0 | 1.5 | 0.02 | 350 |
| No. 8 | 1 | 2 | 1.8 | 0.04 | 45 |
| No. 9 | 1 | 10 | 1.7 | 0.03 | 50 |
| No. 10 | 1 | 16 | 3.5 | 0.05 | 55 |
| No. 11 | 1 | 26 | 4.6 | 0.04 | 95 |
| No. 12 | 1 | 50 | 4.4 | 0.03 | 100 |

When there is no polyoxyalkylene group present, that is, when $n_1+n_2=0$, a large amount of the powder comes off. Accordingly, such a magnetic tape is not satisfactory as a practical matter. At values of $n_1+n_2$ in excess of 16, the magnetic head showed substantial wear. The life of the magnetic head was shorter. Moreover, the coming off of powder tended to increase with higher values of $n_1+n_2$.

EXAMPLE 3

In this example R and R' were $C_{18}H_{37}$, and R'' was $CH_3$. For these tests, no polyoxyalkylene groups were present in the organosilicic compound.

Six types of organosilicic compounds differing from each other in the value of m were prepared. Using each of the organosilicic compounds, six types of magnetic dispersions having the composition of Example 1 were prepared. The dispersions were coated on films to form six magnetic tape samples (samples 13 to 18). The wear of the magnetic head, the dynamic friction coefficient and the coming off of the powder were measured on the magnetic tapes. The results of the measurements are shown in Table 3.

Table 3

| | $R,R' = C_{18}H_{37}$, $R'' = CH_3$ | | | | |
|---|---|---|---|---|---|
| Sample | m | $n_1+n_2$ | Wear of magnetic head ($\mu$) | Dynamic friction coeff. | Coming off of powder ($\mu g$) |
| No. 13 | 1 | 0 | 1.5 | 0.02 | 350 |
| No. 14 | 3 | 0 | 1.7 | 0.03 | 370 |
| No. 15 | 6 | 0 | 2.0 | 0.05 | 200 |
| No. 16 | 10 | 0 | 1.9 | 0.07 | 150 |
| No. 17 | 15 | 0 | 3.7 | 0.10 | 130 |
| No. 18 | 20 | 0 | 4.3 | 0.12 | 160 |

As apparent from Table 3, blooming occurs and the coming off of powder amounts to 130 micrograms even at a value of $m=15$. Consequently, no practically useful magnetic tape could be obtained in this example.

EXAMPLE 4

In this example, R'' was $CH_3$, and R and R' were varied as shown in Table 4. The organosilicic compounds were dispersed in the magnetic dispersion having the composition of Example 1. Two parts of the ten kinds of the organosilicic compounds were added into 100 parts of the magnetic powder. The values of $m$ and $n_1+n_2$ were both 10. Each of the magnetic dispersions was coated on film to form ten samples of magnetic tapes (samples 19 to 28). The wear of the magnetic head, the dynamic friction coefficient and the coming off of the powder were measured on the magnetic tapes. The results of the measurements are shown in Table 4.

TABLE 4

($m = 10$, $n_1+n_2 = 10$, $R'' = CH_3$)

| Sample | R, R' | Wear of magnetic head ($\mu$) | Dynamic friction coeff. | Coming off of powder ($\mu$g) |
|---|---|---|---|---|
| No. 19 | $C_{22}H_{45}-$ | 1.6 | 0.05 | 280 |
| No. 20 | $C_{18}H_{37}-$ | 2.0 | 0.08 | 60 |
| No. 21 | $C_{17}H_{35}-$ | 2.1 | 0.06 | 55 |
| No. 22 | $C_{16}H_{33}-$ | 2.0 | 0.07 | 50 |
| No. 23 | $C_{14}H_{29}-$ | 2.0 | 0.08 | 60 |
| No. 24 | $C_{12}H_{25}-$ | 2.3 | 0.09 | 70 |
| No. 25 | $C_{10}H_{21}-$ | 2.2 | 0.10 | 60 |
| No. 26 | $C_8H_{17}-$ | 2.3 | 0.12 | 60 |
| No. 27 | $C_6H_{13}-$ | 3.8 | 0.16 | 65 |
| No. 28 | $C_5H_{11}-$ | 4.0 | 0.18 | 65 |

As evident from Table 4, the amount of coming off of powder was considerably larger for the hydrocarbon chain containing 22 carbon atoms. The wear of the magnetic head and the dynamic friction coefficient were relatively large in the case of hydrocarbon chains having 5 and 6 carbon atoms, respectively.

EXAMPLE 5 (comparison)

Dimethylsilicone and methylphenylsilicone were used individually as the organosilicic compounds and mixed into magnetic dispersions having the compositions of Example 1. The mixtures were coated on the films to form two kinds of magnetic tapes (Samples 29 and 30). The wear of the magnetic head, the dynamic friction coefficient and the coming off of the powder were measured on these tapes, the results being shown in Table 5.

TABLE 5

| Sample | Organosilicic Compound | Wear of magnetic head ($\mu$) | Dynamic Friction coeff. | coming off of powder ($\mu$g) |
|---|---|---|---|---|
| No. 29 | Dimethylsilicone | 4.0 | 0.22 | 340 |
| No. 30 | Methylphenylsilicone | 4.3 | 0.25 | 350 |

EXAMPLE 6

A magnetic dispersion with the following composition was prepared:

| | |
|---|---|
| Gamma $Fe_2O_3$ | 100 parts |
| Vinylchloride-vinylacetate copolymer resin | 20 parts |
| Polyurethane resin | 10 parts |
| Carbon | 0.5 part |
| Lecithin | 1.0 part |
| Solvent | 300 parts |

The magnetic dispersion was coated on the polyethyleneterephthalate film to a depth of 10 microns to form a magnetic recording layer. Three types of organosilicic compounds were prepared. In the first of these, $m$ was equal to 1, and $n_1+n_2$ was equal to 10 (Sample No. 31). In the second $m$ was equal to 1, and $n_1+n_2$ was equal to 16 (Sample No. 32). In the third $m$ was equal to 10 and $n_1+n_2$ was equal to 10 (Sample No. 33). In all cases, R and R' were $C_{18}H_{37}$ and R'' was $CH_3$. The above-mentioned three organosilicic compounds and dimethylsilicone and methylphenylsilicone (Samples Nos. 35 and 36) were individually dissolved into a solvent consisting of 7 parts methanol and 3 parts toluene to form 1% lubricant compositions (based upon the weight of ferricoxide). The lubricants were coated on the magnetic recording layer to form five types of magnetic tapes (Samples 31, 32, 33, 35 and 36), respectively. A magnetic tape was also prepared without any organosilicic compound and identified as Sample 34. The wear of the magnetic head, the dynamic friction coefficient and the coming off of the powder were measured on the magnetic tape with the results being shown in Table 6.

TABLE 6

| Sample | M | $n_1+n_2$ | Wear of magnetic head ($\mu$) | Dynamic friction coeff. | Coming off of powder ($\mu$g) |
|---|---|---|---|---|---|
| No. 31 | 1 | 10 | 1.8 | 0.03 | 60 |
| No. 32 | 1 | 16 | 2.0 | 0.05 | 55 |
| No. 33 | 10 | 10 | 1.9 | 0.09 | 60 |
| No. 34 | Without coating of organosilicic compound | | 10.5 | 0.31 | 50 |
| No. 35 | Dimethylsilicone | | 4.0 | 0.20 | 370 |
| No. 36 | Methylphenylsilicone | | 4.2 | 0.23 | 400 |

The amount of coming off of powder was slightly larger for the tapes containing the organosilicic compound than for the magnetic tape not containing the compound. However, the wear of the magnetic head and the dynamic friction coefficient were far smaller for the former than for the latter.

As previously described, the magnetic recording medium of the present invention has excellent smoothness and wear-proofness. It can run smoothly for a longer time than conventional tapes.

Obviously many modifications and variations of the present invention are possible in the light of the above teachings. It is therefore to be understood that various modifications can be made to the described embodiments without departing from the scope of the present invention.

We claim as our invention:

1. A magnetic recording medium consisting of a base of non-magnetic material and a magnetic layer containing finely divided magnetic particles dispersed in a binder, said magnetic layer including an organosilicic compound having the formula:

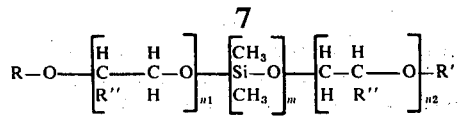

where R and R' are aliphatic alkyl or alkenyl groups having 8 to 18 carbon atoms, R'' is a hydrogen atom or a methyl group, $m$ is an integer in the range from 1 to 15, and $n_1$ plus $n_2$ is an integer in the range from 2 to 16, 3 to 10 parts of said organosilicic compound are included for every 100 parts by weight of magnetic material in said magnetic layer and said organosilicic compound providing substantially the entire lubricating function for said magnetic recording medium.

2. The magnetic recording medium of claim 1 in which R and R' contain 18 carbon atoms, R'' is a methyl group, $m$ is equal to 10, and $n_1$ plus $n_2$ is equal to 10.

3. The magnetic recording medium of claim 1 in which R and R' contain 18 carbon atoms, R'' is a methyl group, $m$ is equal to 1, and $n_1$ plus $n_2$ is equal to 10.

4. A magnetic recording medium of claim 1 in which R'' is a methyl group.

5. The magnetic recording medium of claim 1 in which said organosilicic compound is the reaction product between dimethyl silane or a terminal reactive siloxane represented by the formula:

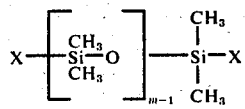

where X is a halogen atom, a hydrogen atom, a hydroxyl group, or an alkoxyl group containing 1 to 3 carbon atoms, $m$ is in the range from 1 to 15, and a polyoxyalkylene glycolmonoalcohol ether having the formula:

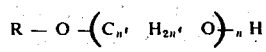

where R is an alkyl or alkenyl group containing 8 to 18 carbon atoms, and $n'$ is 2 or 3.

* * * * *